(12) United States Patent
Nishio

(10) Patent No.: US 10,158,769 B2
(45) Date of Patent: Dec. 18, 2018

(54) DATA TRANSMISSION SYSTEM AND DATA TRANSMISSION METHOD

(71) Applicant: KYOCERA Document Solutions Inc., Osaka (JP)

(72) Inventor: Takatoshi Nishio, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/560,920

(22) PCT Filed: Feb. 3, 2017

(86) PCT No.: PCT/JP2017/003882
§ 371 (c)(1),
(2) Date: Sep. 22, 2017

(87) PCT Pub. No.: WO2017/187699
PCT Pub. Date: Nov. 2, 2017

(65) Prior Publication Data
US 2018/0198927 A1 Jul. 12, 2018

(30) Foreign Application Priority Data
Apr. 28, 2016 (JP) .................. 2016-090083

(51) Int. Cl.
*H04N 1/00* (2006.01)
*H04N 1/21* (2006.01)
*B41J 29/38* (2006.01)
*G06F 3/06* (2006.01)
*G03G 15/00* (2006.01)
(Continued)

(52) U.S. Cl.
CPC .......... *H04N 1/00034* (2013.01); *B41J 29/38* (2013.01); *G03G 15/5087* (2013.01);
(Continued)

(58) Field of Classification Search
None
See application file for complete search history.

(56) References Cited

U.S. PATENT DOCUMENTS 6,758,399 B1 * 7/2004 Brunelli .................. G06K 7/14
235/454
8,712,188 B2 * 4/2014 Roy ....................... H04N 1/387
358/462

(Continued)

FOREIGN PATENT DOCUMENTS

JP       2008-300920 A    12/2008

*Primary Examiner* — Anh-Vinh T Nguyen
(74) *Attorney, Agent, or Firm* — Hawaii Patent Services; Nathaniel K. Fedde; Kenton N. Fedde

(57) ABSTRACT

The invention backups job data, and detects and predicts the occurrence of trouble in a storage device. A gateway registers job data registered in a HDD and vibration-detection information of a vibration-detection sensor received from a user terminal in a memory, and then transmits the job data to a MFP. The MFP registers the job data in a HDD, and according to a request from the gateway, transmits the job data registered in the HDD and vibration-detection information of a vibration-detection sensor to the gateway. The gateway compares the data amount of when the job data is registered in the memory and the data amount of the job data from the gateway, and when there is a difference, registers trouble information related to the HDD in the memory.

7 Claims, 5 Drawing Sheets

(51) Int. Cl.
  *G06F 11/00* (2006.01)
  *G11B 33/08* (2006.01)
  *G06F 13/00* (2006.01)
  *G06F 11/07* (2006.01)
  *G06F 11/14* (2006.01)

(52) U.S. Cl.
  CPC ............ *G06F 3/0604* (2013.01); *G06F 3/068* (2013.01); *G06F 3/0635* (2013.01); *G06F 3/0659* (2013.01); *G06F 11/00* (2013.01); *G06F 11/07* (2013.01); *G06F 11/14* (2013.01); *G06F 13/00* (2013.01); *G11B 33/08* (2013.01); *H04N 1/00* (2013.01); *H04N 1/00549* (2013.01); *H04N 1/21* (2013.01)

(56) References Cited

U.S. PATENT DOCUMENTS

| | | | |
|---|---|---|---|
| 9,451,126 B2* | 9/2016 | Ozawa | H04N 1/3878 |
| 2002/0028027 A1* | 3/2002 | Koyama | G06F 17/145 |
| | | | 382/289 |
| 2003/0133608 A1* | 7/2003 | Bernstein | H04N 1/4097 |
| | | | 382/163 |
| 2004/0184674 A1* | 9/2004 | Lim | G06K 9/3283 |
| | | | 382/275 |
| 2004/0240737 A1* | 12/2004 | Lim | G06K 9/325 |
| | | | 382/182 |
| 2011/0043864 A1* | 2/2011 | Tian | H04N 1/3878 |
| | | | 358/3.26 |
| 2012/0093434 A1* | 4/2012 | Banerjee | G06K 9/3283 |
| | | | 382/266 |
| 2012/0106844 A1* | 5/2012 | Ramachandrula | H04N 1/3878 |
| | | | 382/173 |
| 2012/0120444 A1* | 5/2012 | Hirohata | G06K 9/00449 |
| | | | 358/1.15 |
| 2014/0362248 A1* | 12/2014 | Ishida | H04N 5/23293 |
| | | | 348/222.1 |
| 2015/0222786 A1* | 8/2015 | Ahmad | H04N 1/3878 |
| | | | 358/448 |
| 2015/0324390 A1* | 11/2015 | Macciola | G06K 9/00463 |
| | | | 707/769 |

* cited by examiner

DATA TRANSMISSION SYSTEM AND DATA TRANSMISSION METHOD

TECHNICAL FIELD

The present invention relates to a data transmission system and a data transmission method that is suitable for detecting trouble in a storage device.

BACKGROUND ART

In image-forming apparatuses such as printers, multifunctional printers, multifunction peripherals (MFP), for example, there are models that are capable of private printing. In other words, in private printing, for example, a printing job is registered for an image-forming apparatus from a user terminal via a network such as a local area network (LAN) and the like using authentication information (password or the like). Then, after authentication that is required for login is successful on the image-forming apparatus side, it becomes possible to execute a printing process for a selected printing job.

Incidentally, a hard disk drive (HDD) as a storage device for storing various application programs, printing jobs and the like is mounted in the user terminal and the image-forming apparatus. A HDD, has an advantage of having a large storage capacity, however, has a disadvantage in that it is vulnerable to vibration. Moreover, when trouble occurs in a HDD due to vibration or the like, reading and writing of data may not be performed properly.

As a way to eliminate this kind of trouble, Patent Document 1 proposes an image-processing apparatus that has a vibration-detection sensor for determining whether or not there is vibration that affects the HDD, and a storage controller that causes information to be stored on the HDD, and when the vibration-detection sensor detects vibration, the storage controller switches the information-storage destination from the HDD to a nonvolatile memory.

PRIOR ART LITERATURE

Patent Literature

Patent Document 1: JP2008-300920 (A)

SUMMARY OF INVENTION

Problem to be Solved by Invention

In the image-processing apparatus described in Patent Document 1 above, the information storage destination is switched from a HDD to a non-volatile memory, so it is possible to eliminate the trouble in a HDD due to vibration without being restricted by the device design.

However, in this image-processing apparatus, saving information is possible, however, there is a problem in that it is not possible to detect or predict the occurrence of trouble in a HDD.

Taking the situation described above into consideration, an object of the present invention is to provide a data-transmission system and data-transmission method that are capable of eliminating the problems described above.

Means for Solving the Problems

The image-forming apparatus of the present invention includes: a user terminal having a first vibration-detection sensor and first storage device; an image-forming apparatus having a second vibration-detection sensor and second storage device; and a relay device having a third storage device, and that after job data that is stored in the first storage device and vibration-detection information of the first vibration-detection sensor that are received from the user terminal are registered in the third storage device, transmits the job data to the image-forming apparatus; wherein the image-forming apparatus registers the job data in the second storage device, and according to a request from the relay device, transmits the job data that is registered in the second storage device and vibration-detection information of the second vibration-detection sensor to the relay device; and the relay device compares the amount of data when the job data is registered in the third storage device and the amount of data of the job data from the image-forming apparatus, and when there is difference in the data amount, registers trouble information related to the second storage device in the third storage device.

The data transmission method of the present invention, has: a step whereby a relay device registers job data that is registered in a first storage device and vibration-detection data of a first vibration-detection sensor that are received from a user terminal in a third storage device, and then transmits the job data to an image-forming apparatus that has a second vibration-detection sensor and second storage device; and a step whereby the image-forming apparatus registers the job data in the second storage device, and according to a request from the relay device, transmits the job data that is registered in the second storage device and vibration-detection information of the second vibration-detection sensor to the relay device; and the relay device compares the amount of data when the job data is registered in the third storage device and the amount of data of the job data from the image-forming apparatus, and when there is difference in the data amount, registers trouble information related to the second storage device in the third storage device.

In the data transmission system and data transmission method of the present invention, a relay device registers job data that is registered in a first storage device and vibration-detection information of a first vibration-detection sensor that are received from a user terminal in a third storage device, and then transmits the job data to an image-forming apparatus that has a second vibration-detection sensor and second storage device. The image-forming apparatus registers the job data in the second storage device, and according to a request from the relay device, transmits the job data that is registered in the second storage device and vibration-detection information of the second vibration-detection sensor to the relay device. Then, the relay device compares the amount of data when the job data is registered in the third storage device and the amount of data of the job data from the image-forming apparatus, and when there is difference in the data amount, registers trouble information related to the second storage device in the third storage device.

As a result, even when trouble occurs in the second storage device of the image-forming apparatus and it becomes impossible to read job data that is stored in the second storage device, the relay device is able to give job data that is registered in the third storage device to the image-forming apparatus. Moreover, by the relay device referencing trouble information that is registered in the third storage device, it is possible to check for change in the difference in the data amount.

Effect of Invention

With the data transmission system and data transmission method of the present invention, in addition to a relay device performing backup of job data from a user terminal, the relay device is able to check for change in the difference in the data amount by referencing trouble information that is registered in the third storage device. It is possible to perform detection and prediction of the occurrence of trouble in a storage device.

EMBODIMENTS FOR CARRYING OUT THE INVENTION

In the following, an embodiment of a data transmission system of the present invention will be explained with reference to FIG. 1 to FIG. 4. In the explanation below, a multifunction peripheral (MFP) that is a combined peripheral machine that has for example a printing function, a copying function, a fax function and a data transmission/reception function via a network is used as an example of an image-forming apparatus that is included in the data transmission system.

Figure 1:
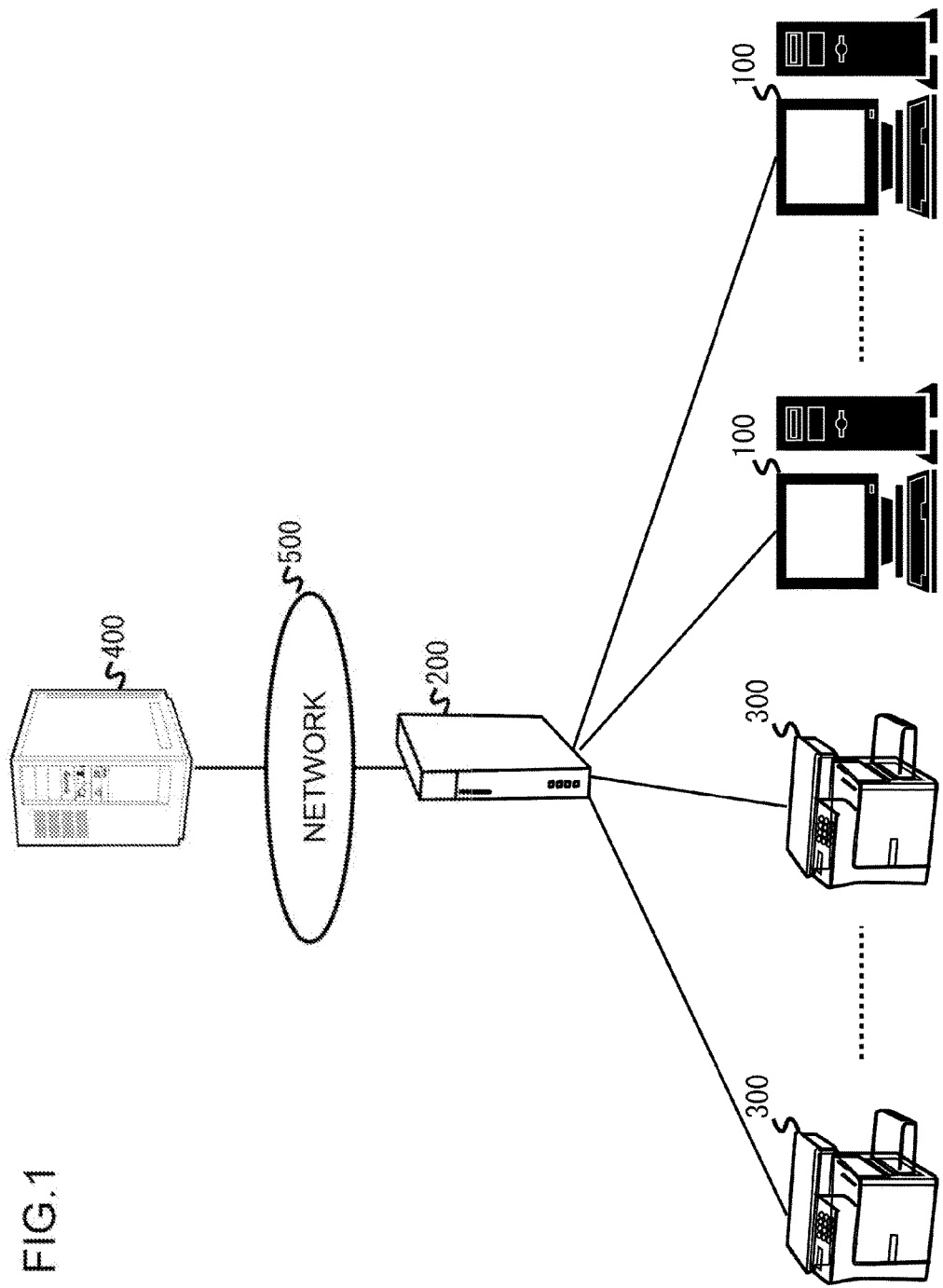
FIG. 1 is a diagram for explaining an embodiment of a data transmission system of the present invention.
Figure 2:
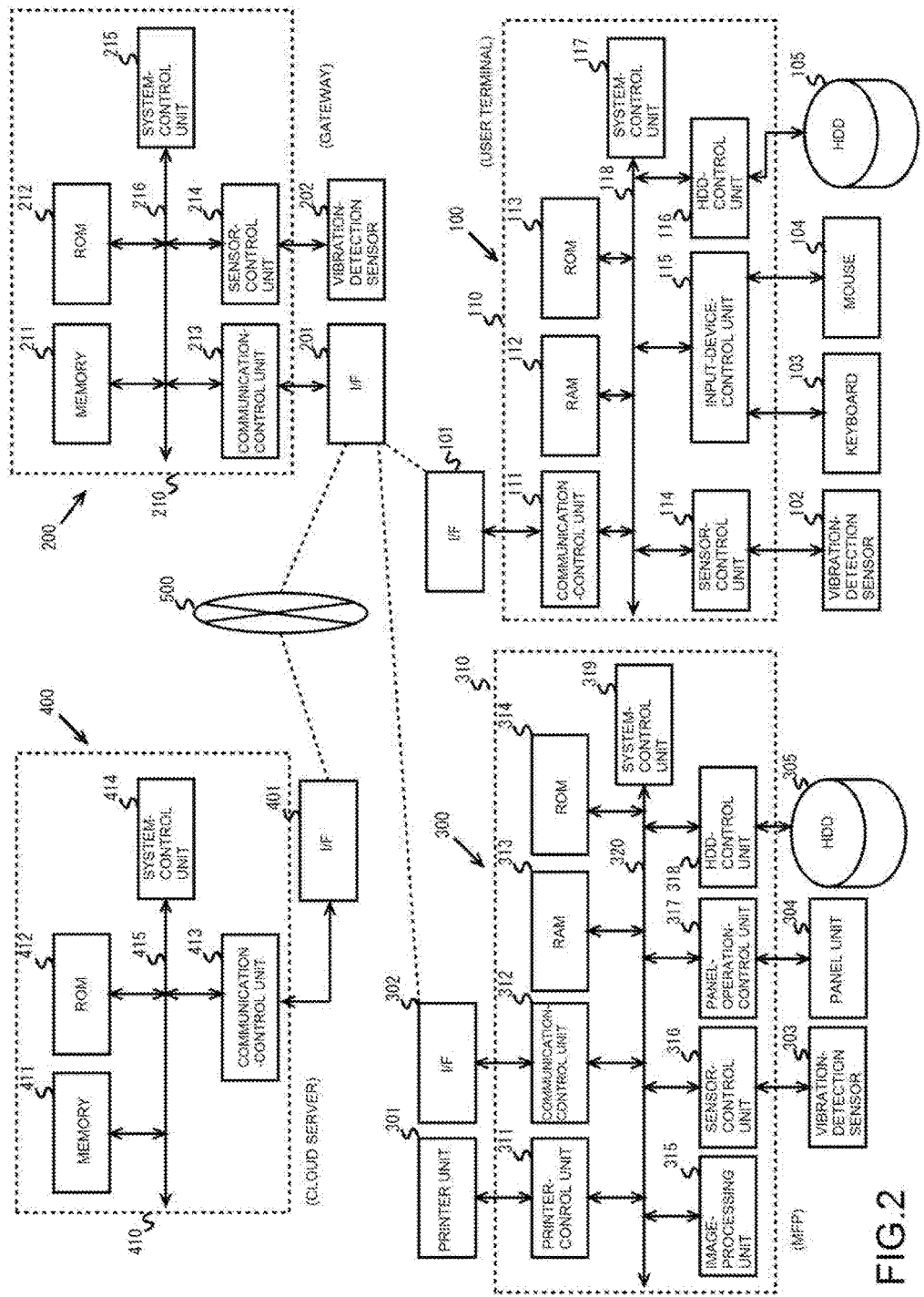
FIG. 2 illustrates an example of the configuration of a user terminal, a gateway, a MFP and a cloud server in FIG. 1.

First, as illustrated in FIG. 1, the data transmission system includes user terminals 100, a gateway 200 as a relay device, MFPs 300, and a cloud server 400. The user terminals 100 and MFPs 300 are connected via the gateway 200. The gateway 200 and the cloud server 400 are connected via the network 500. The cloud server 400 may be omitted. Moreover, a user terminal 100 and a MFP 300 may be a single unit, or may be plural units. Furthermore, the relay device may be a document management server or a system management server.

Here, the MFP 300 is equipped with a private printing function. In other words, in private printing, for example, a printing job is registered for the MFP 300 from a user terminal 100 via the network 200 using authentication information such as a user name and password. Then, after authentication that is required for login processing is successful on the MFP 300 side, it becomes possible to execute printing of a selected printing job.

The gateway 200 of this embodiment will be explained in detail below, however, for example, when there is a difference in the amount of data of a printing job that is transmitted from a user terminal 100 to a MFP 300, this is taken to be trouble in the storage device, and in addition to a backup for the printing job (stored in the gateway 200), the gateway 200 stores trouble information (information indicating the difference in the data amount and the like). When a cloud server 400 is used, as in the case of the gateway 200, it is possible to cause storage of the printing job and storage of trouble information to be performed.

Next, an example of the configuration of a user terminal 100, gateway 200. MFP 300 and cloud server 400 will be explained with reference to FIG. 2, FIG. 3A and FIG. 3B. First, the user terminal 100 includes a control unit 110 that controls an I/F (interface) 101, a vibration-detection sensor 102, a keyboard 103, a mouse 104 and HDD (a hard disk drive) 105.

The I/F 101 takes charge of communication with a MFP 300, another user terminal 100 and the like via the gateway 200. The I/F 101 may also take charge of communication with a content server, web server and the like (not illustrated in figure) via the gateway 200. The vibration-detection sensor 102 detects vibration that is applied to the HDD 105. The keyboard 103 is an input device for inputting characters and the like to the control unit 110. The mouse 104 is an input device for indicating input positions and the like to the control unit 110. The HDD 105 is a storage device for storing application programs and the like for providing the various functions of the user terminal 100.

The control unit 110 is a processor that controls the overall operation of the user terminal 100 by executing application programs, control programs and the like. The control unit 110 includes a communication control unit 111, RAM (random access memory) 112, ROM (read-only memory) 113, sensor-control unit 114, input-device-control unit 115, HDD-control unit 116, and system-control unit 117. Moreover, these are all connected to a data bus 118.

The communication-control unit 111 performs control via the I/F 101 of transmission and reception of data and the like via the gateway 200. The RAM 112 is a work memory for executing programs. The ROM 113 stores control programs for performing operation checks and the like for each unit. The sensor-control unit 114 controls the detection operation by the vibration-detection sensor 102, and notifies the system-control unit 117 of vibration-detection information that indicates the detection results by the vibration-detection sensor 102. The input-device-control unit 115 controls the input operations by the keyboard 103 and mouse 104, and sends input signals from the keyboard 103 and mouse 104 to the control unit 110. The HDD-control unit 116 controls reading data from and writing data to the HDD 105.

The system-control unit 117 controls linked operation of each unit. Moreover, when there is an instruction for registering a printing job in an MFP 300 via the keyboard 103 or mouse 104, the system-control unit 117 transmits the printing job and vibration-detection information from the vibration-detection sensor 102 to the gateway 200 via the I/F 101. The vibration-detection information from the vibration-detection sensor 102 may be information at the time when printing data that is included in a printing job is written to the HDD 105, or may be information at the time when printing data is read from the HDD 105. Moreover, the printing job includes printing data, data that indicates the number of pages, data that indicates the size and type of printing paper, data amount and the like.

The gateway 200 includes a control unit 210 that controls an I/F 201 and a vibration-detection sensor 202. The I/F 201 takes charge of communication with user terminals 100, MFPs 100 and the like. The I/F 201 also takes charge of communication with the cloud server 400 via the network 500. The I/F 201 may also take charge of communication with a content server, web server and the like (not illustrated in the figure) via the network 500. The vibration-detection sensor 202 detects vibration that is applied to the gateway 200 itself. The vibration-detection sensor 202 may be omitted.

The control unit 210 is a processor that controls the overall operation of the gateway 200 by executing application programs, control programs and the like. The control unit 210 includes a memory 211, a ROM 212, a communication-control unit 213, a sensor-control unit 214, and a system-control unit 215. Moreover, these are connected to a data bus 216.

Figure 3A:
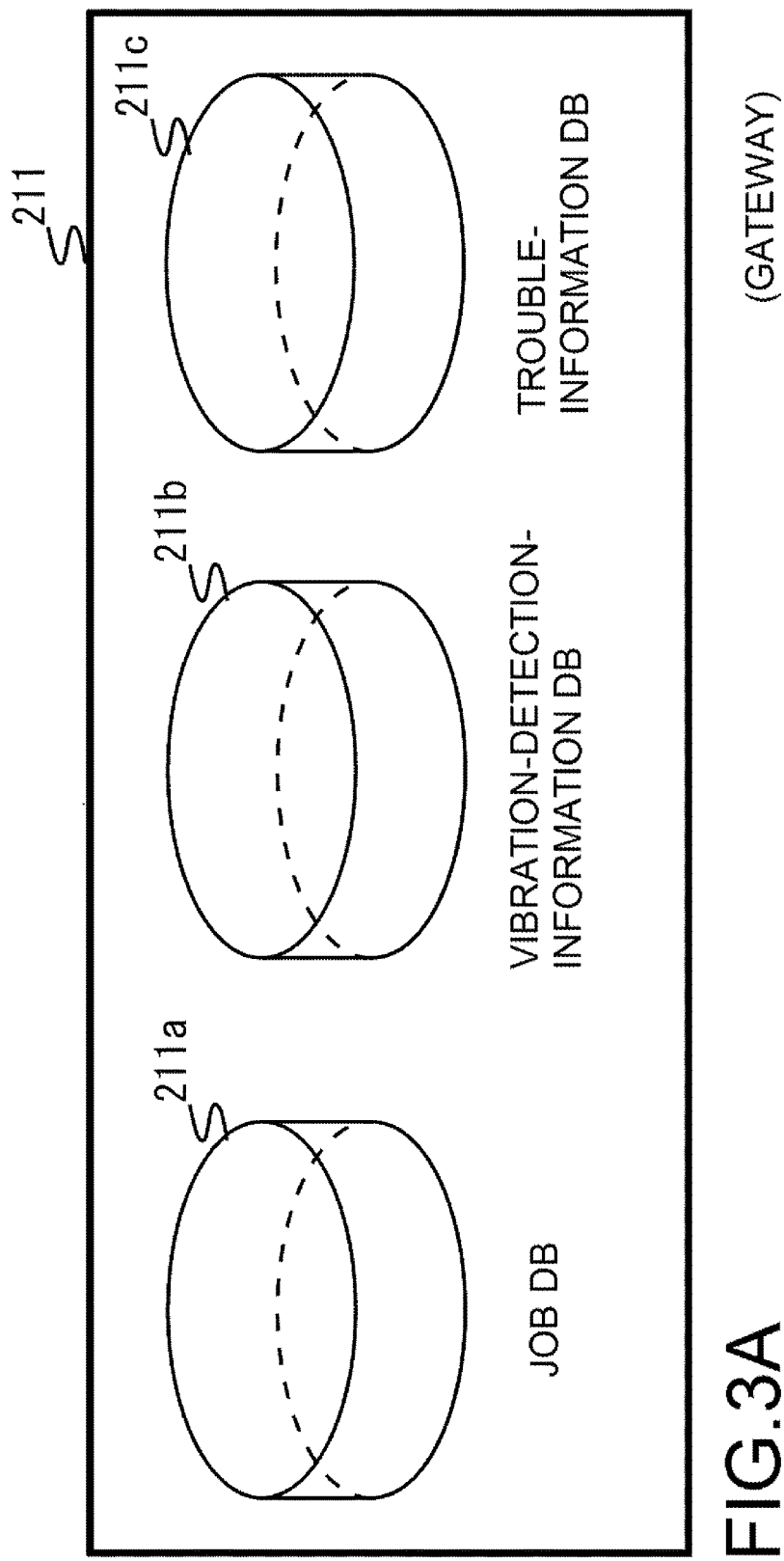
FIG. 3A illustrates an example of databases inside the memory of the gateway and the cloud server in FIG. 1, and illustrates databases inside the memory of the gateway.

The memory 211 is a work memory for executing programs. Moreover, the memory 211, as illustrated in FIG. 3A, has a job DB (database) 211a in which printing jobs from user terminals 100 are registered, a vibration-detection-information DB 211b in which vibration-detection information from vibration-detection sensors 102 is registered, and a trouble-information DB 211c in which trouble information (information that indicates a difference in the amount of data, and the like) is registered. Printing jobs that are received from user terminals 100 and printing jobs obtained from MFPs 300 are registered in the job DB 211a, vibration-detection information from vibration-detection sensors 102 received from user terminals 100, and vibration-detection information from vibration-detection sensors 303 (described later) obtained from MFPs 300 are registered in the vibration-detection-information DB 211b. Moreover, vibration-detection information from the vibration-detection sensor 202 may also be registered in the vibration-detection-information DB 211b.

Here, a printing job that is obtained from a MFP 300 is a printing job from a user terminal 100 that is registered in a MFP 300 via the gateway 200. In other words, a printing job from a user terminal 100 is temporarily registered in the job DB 211a of the gateway 200, and then further transmitted to a MFP 300. The gateway 200 registers a printing job that is obtained from a MFP 300 in the job DB 211a by sending a return request for a transmitted printing job to the MFP 300. In this case, the gateway 200 also requests vibration-detection information at the same time from the vibration-detection sensor 303 (described later). Moreover, the gateway 200 compares the amount of data of a printing job from the user terminal 100 with the amount of data of the printing job from the MFP 300, and when there is a difference in the amount of data, registers trouble information in the trouble-information DB 211c.

Trouble information includes information that indicates the registration date of the printing job, the difference in the amount of data associated with the unique device information of the MFP 300, and the like. Moreover, when there is a difference in the amount of data in a printing job that is received from a user terminal 100, information that indicates the difference in the amount of data associated with the unique terminal information of the user terminal 100 is also included in the trouble information. In that case, the gateway 200 is able to determine whether or not there is a difference in the data amount by comparing the data amount when a printing job received from a user terminal 100 is registered in the job DB 211a and the data amount included in a printing job that is received from the user terminal 100.

The ROM 212 stores control programs for performing operation checks and the like for each unit. The communication-control unit 213, via the I/F 201, performs control of transmission and reception of data and the like between a user terminal 100 and a MFP 300. Moreover, the communication-control unit 213, via the IF 201, performs control of transmission and receception of data and the like via a network 500. The sensor-control unit 214 controls the detection operation of the vibration-detection sensor 202, and notifies the system-control unit 215 of vibration-detection information from the vibration-detection sensor 202.

The system-control unit 215 controls linked operation and the like of each of the units. Moreover, the system-control unit 215 registers a printing job from a user terminal 100 in the job DB 211a, and registers vibration-detection information of a vibration-detection sensor 102 from a user terminal 100 in the vibration-detection-information DB 211b. Furthermore, the system-control unit 215 compares the amount of data of a printing job from a user terminal 100 with the amount of data of a printing job from a MFP 300, and when there is a difference in the amount of data, registers trouble information in the trouble-information DB 211c. The system-control unit 215 also transmits printing jobs that are registered in the job DB 211a, vibration-detection information that is registered in the vibration-detection-information DB 211b, and trouble information that is registered in the trouble-information DB 211c to the cloud server 400 via the network 500.

The MFP 300 includes a control unit 310 that controls a printer unit 301, an I/F 302, a vibration-detection sensor 303, a panel unit 304, and a HDD 305. The MFP 300 may also include a scanner unit, a FAX unit and the like.

The printer unit 301 is a device for printing images on printing paper (not illustrated) based on printing data that is outputted from the control unit 310. The I/F 302 takes charge of communication with other MFPs 300, user terminals 100 and the like via the gateway 200. The I/F 302 may also take charge of communication with a content server, web server and the like (not illustrated) via the gateway 200. The vibration-detection sensor 303 detects vibration that is applied to the HDD 305. The panel unit 304 is a device such as a touch panel that performs displays for the printing function, copy function, FAX function, data transmission/reception function via a network of the MFP 300, and for various settings. The HDD 305 is a storage device that stores application programs and the like for providing the various functions of the MFP 300. Moreover, the HDD 305 has user boxes for storing registered printing jobs from user terminals 100.

The control unit 310 is a processor that controls the overall operation of the MFP 300 by executing image-forming programs, control programs and the like. The control unit 310 includes a printer-control unit 311, a communication-control unit 312, a RAM 313, a ROM 314, an image-processing unit 315, a sensor-control unit 316, a panel-operation-control unit 317, a HDD-control unit 318, and a system-control unit 319. Moreover, these are connected to a data bus 320.

The printer-control unit 311 controls the printing operation of the printer unit 301. The communication-control unit 312, via the I/F 302, performs control of transmission and reception of data and the like via the gateway 200. The RAM 313 is a work memory for executing programs. The ROM 314 stores control programs for performing operation checks and the like of each unit. The image-processing unit 315 performs image processing (rasterizing) of a printing job that is registered in a user box of the HDD 305, for example. The system-control unit 319 temporarily stores printing data for which image processing has been performed by the image-processing unit 315 in the RAM 313.

The sensor-control unit 316 controls the detection operation of the vibration-detection sensor 303, and notifies the system-control unit 319 of the vibration-detection information from the vibration-detection sensor 303. The panel-operation-control unit 317 controls the display operation of the panel unit 304. Moreover, the panel-operation-control unit 317, via the panel unit 304, receives settings and the like for starting printing, copying, FAX, data transmission or reception via the gateway 200, and the like. The HDD-control unit 318 controls reading data from or writing data to the HDD 305.

The system-control unit 319 causes the HDD-control unit 318 to register a printing job that is received from the gateway 200 in a user box of the HDD 305. Moreover, the system-control unit 319, according to a request from the gateway 200, transmits a printing job that is registered in a user box of the HDD 305 and vibration-detection information from the vibration-detection sensor 303 to the gateway 200. The vibration-detection information from the vibration-detection sensor 303 may be information at the time when a printing job is received from the gateway 200, or may be information at the time when a printing job is registered in a user box of the HDD 305, or may be information at the time when a printing job is read from the HDD 305.

The cloud server 400 includes a control unit 410 that controls an I/F 401. The I/F 401 takes charge of communication with the gateway 200 via the network 500. The control unit 410 is a processor that controls the overall operation of the cloud server 400 by executing application programs, control programs and the like. The control unit 410 includes a memory 411, a ROM 412, a communication-control unit 413, and a system-control unit 414. Moreover, these are connected to a data bus 415.

Figure 3B:
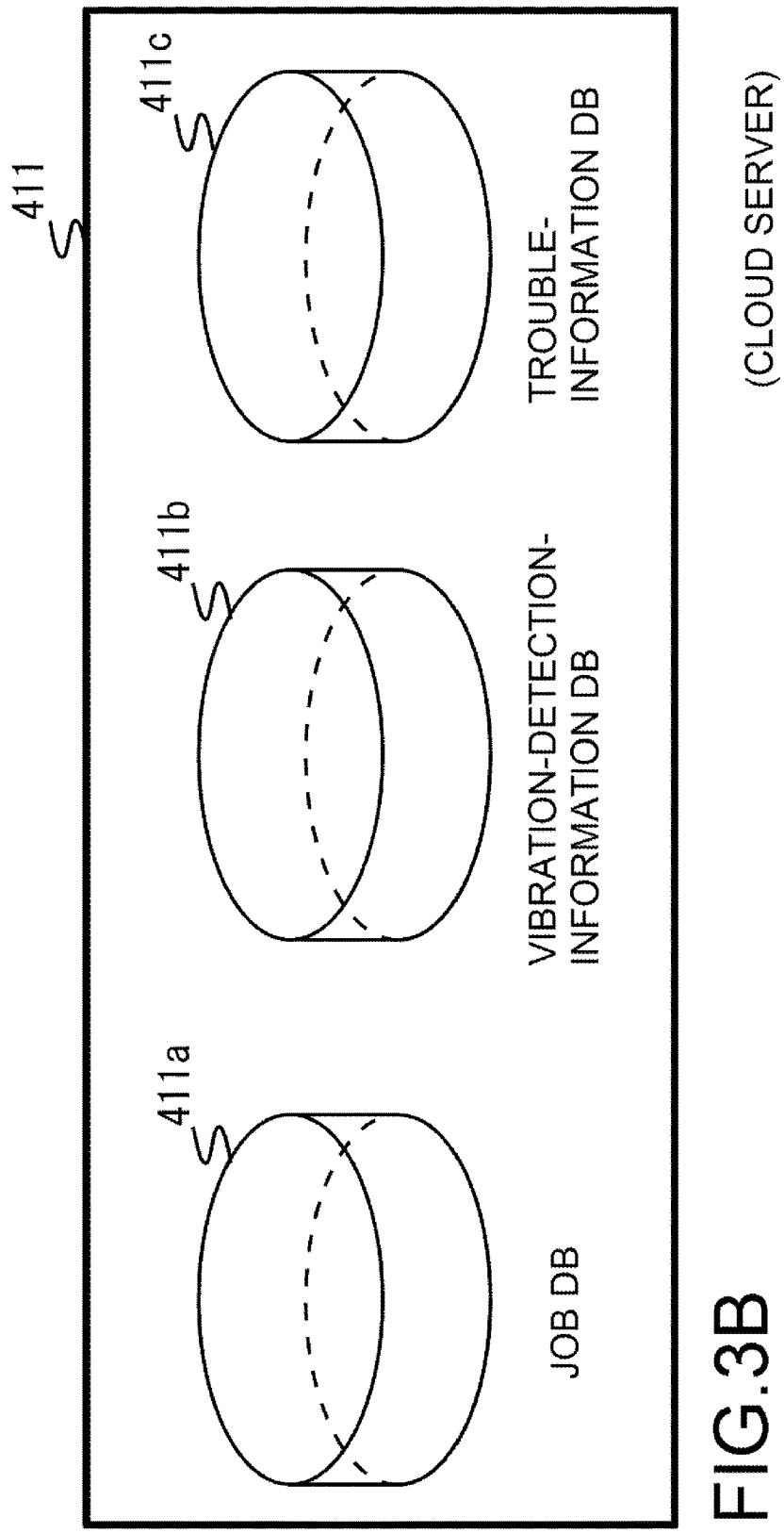
FIG. 3B illustrates an example of databases inside the memory of the gateway and the cloud server in FIG. 1, and illustrates databases inside the memory of the cloud server.

The memory 411 is a work memory for executing programs. Moreover, as illustrated in FIG. 3B, the memory 411 has a job DB 411*a* for registering a printing job that is received from the gateway 200, a vibration-detection information DB 411*b* for registering vibration-detection information that is received from the gateway 200, and a trouble information DB 411*c* for registering trouble information that is received from the gateway 200.

The ROM 412 stores control programs for performing operation checks and the like for each of the units. The communication-control unit 413, via the I/F 401, performs control for transmitting data to or receiving data from the gateway 200 via the network 500. Moreover, the communication-control unit 413, via the gateway 200, performs control for transmitting data to or receiving data from between a user terminal 100 and a MFP 300 via the network 500.

The system-control unit 414 respectively registers printing jobs, vibration-detection information and trouble information from the gateway 200 in the job DB 411*a*, vibration-detection information DB 411*b*, and trouble information DB 411*c* of the memory 411. Moreover, the system-control unit 414, according to requests from the gateway 200, respectively transmits printing jobs, vibration-detection information and trouble information registered in the job DB 411*a*, vibration-detection information DB 411*b* and trouble information DB 411*c*.

Figure 4:
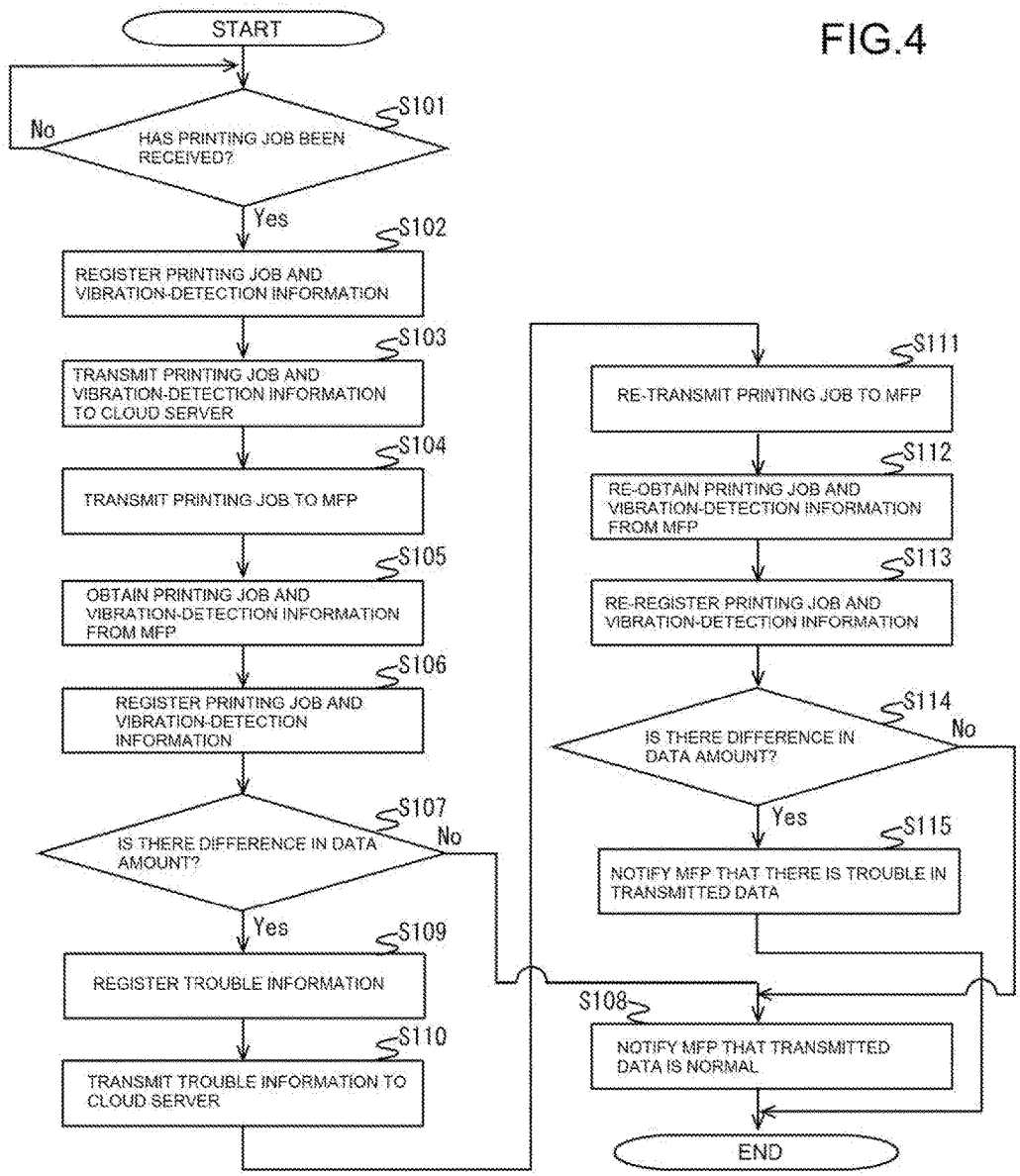
FIG. 4 is a flowchart for explaining a data transmission method of the data transmission system in FIG. 1.

Next, the data transmission method of the data transmission system will be explained with reference to FIG. 4. In the following, the explanation will center on the processing by the gateway 200. Moreover, it is presumed that when a printing job from a user terminal 100 is registered in a MFP 300, vibration-detection information from the vibration-detection sensor 102 will be added to the printing job and transmitted.

(Step S101)

First, the system-control unit 215 determines whether or not a printing job is received.

In this case, when there is no notification from the communication-control unit 213 that a printing job has been received from a user terminal 100, the system-control unit 215 determines that a printing job has not been received (step S101: NO).

However, when there is a notification from the communication-control unit 213 that a printing job has been received from a user terminal 100, the system-control unit 215 determines that a printing job has been received (step S101: YES), and processing advances to step S102.

(Step S102)

The system-control unit 215 registers the printing job from the user terminal 100, and vibration-detection information that indicates the detection results of the vibration-detection sensor 102 that are received by the communication-control unit 213 in the job DB 211*a* and the vibration-detection information DB 211*b* of the memory 211.

(Step S103)

The system-control unit 215, via the communication-control unit 213, transmits the printing job registered in the job DB 211*a* and the vibration-detection information from the vibration-detection sensor 102 registered in the vibration-detection-information DB 211*b* of the memory 211 to the cloud server 400.

When doing this, the system-control unit 414 of the cloud server 400 respectively registers the printing job received from the gateway 200 and the vibration-detection information from the vibration-detection sensor 102 in the job DB 411*a* and the vibration-detection-information DB 411*b* of the memory 411.

(Step S104)

The system-control unit 215, via the communication-control unit 213, transmits the printing job registered in the job DB 211*a* of the memory 211 to a MFP 300.

In this case, the system-control unit 319 of the MFP 300 causes the HDD-control unit 318 to register the printing job received from the gateway 200 in a user box of the HDD 305.

(Step S105)

The system-control unit 215 obtains a printing job and vibration-detection information of the vibration-detection sensor 303 from the MFP 100.

In this case, the system-control unit 215 requests the MFP 300 to transmit a printing job and the vibration-detection information of the vibration-detection sensor 203. When doing this, the system-control unit 319 of the MFP 300 transmits a printing job that is registered in a user box of the HDD 305 according to the request from the gateway 200, and vibration-detection information of the vibration-detection sensor 303 to the gateway 200. The vibration-detection information of the vibration-detection sensor 303, as described above, may be information at the time that the printing job is received from the gateway 200, may be information at the time that the printing job is registered in a user box of the HDD 305, or may be information at the time that the printing job is read from the HDD 305.

(Step S106)

The system-control unit 215 registers the printing job from the MFP 300, and the vibration-detection information of the vibration-detection sensor 303 that are received by the communication-control unit 213 in the job DB 211*a* and the vibration-detection-information DB 211*b* of the memory 211.

(Step S107)

The system-control unit 215 determines whether or not there is a difference in the amount of data.

In this case, the system-control unit 215 compares the amount of data of the printing job from the user terminal 100 that is registered in step S102 and the amount of data of the printing job from the MFP 300 that is registered in step S106. When there is no difference in the amount of data (step S107: NO), the system-control unit 215 advances to step S108.

However, when there is a difference in the amount of data (step S107: YES), the system-control unit 215 advances to step S109.

For the difference in the amount of data, it is possible to provide a fixed allowable range. In other words, this is because depending on a difference in the processing performance of the HDD 105 of the user terminal 100, and the processing performance of the HDD 305 of the MFP 300, for example, a difference may occur in the amount of data of the printing job transmitted to the gateway 200 from the user terminal 100 and the amount of data of the printing job transmitted to the gateway 200 from the MFP 300 even when the HDDs 105, 305 are normal.

(Step S108)

The system-control unit 215 notifies the MFP 300 that transmitted data is normal.

In other words, the system-control unit 215 notifies the MFP 300 that transmission of the printing job from the user terminal 100 that is transmitted in step S104 is normal.

In this case, the system-control unit 319 of the MFP 300, via the panel-operation-control unit 317, may cause the panel unit 304 to display that the transmitted data is proper. Moreover, the system-control unit 319, via the HDD-control unit 318, may attach data to the printing job that is registered in the user box of the HDD 305 indicating that the printing job is proper.

Then, after authorization required in the login process is successful, and after a printing job that is registered in the HDD 305 is selected, the system-control unit 319 of the MFP 300 instructs the image-processing unit 315 to perform image processing, and instructs the printer-control unit 311 to perform printing by the printer unit 301. When data indicating that the printing job is proper is attached to the printing job, it is possible to indicate on the printing-job-selection screen of the panel unit 304 that the printing job is proper.

(Step S109)

The system-control unit 215 registers trouble information in the trouble-information DB 211c of the memory 211. The trouble information in this case is related to the HDD 305 of the MFP 300.

(Step S110)

The system-control unit 215 transmits the trouble information to the cloud server 400.

In this case, the system-control unit 215 transmits the trouble information that is registered in the trouble-information DB 211c to the cloud server 400. When doing this, the system-control unit 414 of the cloud server 400 registers the trouble information from the gateway 200 in the trouble-information DB 411c of the memory 411.

(Step S111)

The system-control unit 215, via the transmission-control unit 213, re-transmits the printing job from the user terminal 100 that is registered in the job DB 211a of the memory 211 to the MFP 300.

(Step S112)

The system-control unit 215 re-obtains the printing job and the vibration-detection information of the vibration-detection sensor 303 from the MFP 100.

In this case, the system-control unit 215 sends a request again to the MFP 300 to transmit the printing job and the vibration-detection information of the vibration-detection sensor 203. When doing this, the system-control unit 319 of the MFP 300 transmits the printing job that is registered in the user box of the HDD 305 and the vibration-detection information of the vibration-detection sensor 303 according to the re-request from the gateway 200 to the gateway 200.

(Step S113)

The system-control unit 215 re-registers the printing job from the MFP 300 and the vibration-detection information of the vibration-detection sensor 303 that are received by the communication-control unit 213 in the job DB 211a and the vibration-detection-information DB 211b of the memory 211.

(Step S114)

The system-control unit 215 re-determines whether or not there is a difference in the data amount.

In this case, the system-control unit 215 compares the amount of data of the printing job from the user terminal 100 that is registered in step S102 and the amount of data of the printing job from the MFP 300 that is registered in step S113. When there is no difference in the amount of data (step S114: NO), the system-control unit 215 moves to step S108.

However, when there is difference in the amount of data (step S114: YES), the system-control unit 215 moves to step S115.

(Step S115)

The system-control unit 215 notifies the MFP 300 that there is trouble in the transmission data.

In other words, the system-control unit 215 notifies the MFP 300 that there is trouble in the transmitted data of the printing job from the user terminal 100 that is re-transmitted in step S111.

In this case, the system-control unit 319 of the MFP 300, via the panel-operation-control unit 317, may cause the panel unit 304 to display that there is trouble in the transmitted data. Moreover, the system-control unit 319, via the HDD-control unit 318, may also add data to the printing job that is registered in the user box of the HDD 305 indicating that there is trouble in the printing job.

Then, after authentication that is required for the login process is successful, and the printing job that is registered in the HDD 305 is selected, the system-control unit 319 of the MFP 300 instructs the image-processing unit 315 to perform image processing, and instructs the printer-control unit 311 to perform printing by the printer unit 301. When data is added indicating that there is trouble in the printing job, it is possible to display on the printing job selection screen of the panel unit 304 that there is trouble in the printing job.

In the explanation above, the system-control unit 215 of the gateway 200 compares the amount of data of the printing job from the user terminal 100 and the amount of data of the printing job from the MFP 300, and when there is difference in the data amount, the case is presumed in which trouble information related to the HDD 305 of the MFP 300 is registered in the trouble-information DB 211c, however, trouble information of the HDD 105 of the user terminal 100 may also be registered.

In this case, the printing job transmitted from the user terminal 100, as described above, includes printing data, data indicating the number of pages, data indicating the size and type of printing paper, the amount of data and the like. Therefore, in step S101, the system-control unit 215 of the gateway 200 may compare the amount of data when the printing job from the user terminal 100 is received and registered in the job DB 211a, and the amount of data that is included in the received printing job, and determine whether or not there is a difference in the data amount. Moreover, when there is a difference in the data amount, the system-control unit 215 in step S109 may transmit trouble information to the cloud server 400, and in step S110, may register trouble information in the trouble-information DB 211c. Furthermore, the system-control unit 215, in step S112, may re-obtain the printing job and vibration-detection information from the user terminal 100, and in step S114, determine again whether or not there is difference in the data amount. Then, where there is no difference in the data amount, the system-control unit 215, in step S108, may notify the user terminal 100 that the transmitted data is proper, and when there is difference in the data amount, the system-control unit 215, in step S115, may notify the user terminal 100 that there is trouble in the transmitted data. In doing so, when there is difference in the data amount, it is possible to register trouble information related to the HDD 105 of the user terminal 100 in the trouble-information DB 211c.

In this way, in this embodiment, the gateway 200 (relay device) registers job data (printing job) that is stored in the HDD 105 (first storage device) and vibration-detection information of the vibration-detection sensor 102 (first vibration-detection sensor) that are received from the user terminal 100 in the memory 211 (third storage device), and then transmits the job data (printing job) to a MFP 300 (image-forming apparatus) having a vibration-detection sensor 303 (second vibration-detection sensor) and HDD 305 (second storage device). The MFP 300 (image-forming apparatus) registers job data (printing job) in the HDD 305 (second storage device), and transmits job data (printing job) that is registered in the HDD 305 (second storage device) and vibration-detection information of the vibration-detection sensor 303 (second vibration-detection sensor) to the gateway 200 (relay device) according to a request from the gateway 200 (relay device). Then, the gateway 200 (relay device) compares the amount of data when the job data (printing job) is registered in the memory 211 (third storage device) and the amount of data of the job data (printing job) from the gateway 200 (relay device), and when there is difference in the data amount, registers trouble information related to the HDD 305 (second storage device) in the memory 211 (third storage device).

As a result, it is possible to register job data (printing job) from the user terminal 100 and trouble information related to the HDD 305 (second storage device) on the MFP 300 side (image-forming apparatus) in the memory 211 (third storage device) of the gateway 200 (relay device). Then, when trouble occurs in the HDD 305 (second storage device) of the MFP 300 (image-forming apparatus), it is possible for the gateway 200 (relay device) to give the MFP 300 (image-forming apparatus) the job data (printing job) that is registered in the memory 211 (third storage device) even when it is not possible to read the job data (printing job) that is stored in the HDD 305 (second storage device), so it is possible to backup the job data (printing job) from the user terminal 100. Moreover, by the gateway 200 (relay device) referencing the trouble information that is registered in the memory 211 (third storage device), it is possible to check change in the difference in the amount of data, so it is possible to detect and predict the occurrence of trouble in a storage device.

In other words, when the difference in the amount of data found by comparing the amount of data of the printing job from the user terminal 100 and the amount of data of the printing job from the MFP 300 is a set value or greater, the gateway 200 (relay device) can perform detection of the occurrence of trouble in a storage device. Moreover, when the difference in the amount of data found by comparing the amount of data of the printing job from the user terminal 100 and the amount of data of the printing job from the MFP 300 is greater than the previously registered amount of data by a fixed amount or more, it is possible for the gateway 200 (relay device) to predict the occurrence of trouble in a storage device.

When the vibration-detection information that is transmitted together with the printing job from the user terminal 100 and the vibration-detection information that is obtained in step S105 indicate that vibration is equal to or less than a specified threshold value, the system-control unit 215 of the gateway 200 may move to the processing of step S108 without performing the determination in step S107. The specified threshold value, for example, may be the respective standard value of vibration resistance or shock resistance of the HDD 105 and HDD 305 for the vibration-detection information of the vibration-detection sensor 102 and the vibration-detection information of the vibration-detection sensor 303.

Moreover, when the vibration-detection information that is transmitted together with the printing job from the user terminal 100, the vibration-detection information obtained in step S105 and the vibration-detection information of the vibration-detection sensor 202 indicate that vibration is equal to or less than a specified threshold value, the system-control unit 215 may determine "NO" in step S107 without performing the determination of whether or not there is difference in the data amount.

Furthermore, when of the obtained vibration-detection information, only the vibration-detection information obtained in step S105 indicates vibration that exceeds a specified threshold value, and the vibration-detection information that is re-obtained in step S112 is equal to or less than a specified threshold value, the system-control unit 215 may determine "NO" in step S114 without performing the determination of whether or not there is difference in the data amount.

Moreover, when the vibration-detection information that is transmitted together with the printing job from the user terminal 100 indicates vibration that is greater than a specified threshold value, the system-control unit 215, in step S111, may request the user terminal 100 to re-transmit the printing job, re-register the printing job and vibration-detection information that are re-transmitted from the MFP 300 in the job DB 211a and vibration-detection-information DB 211b of the memory 211, and re-transmit the re-registered printing job to the MFP 300. In this case, only when the vibration-detection information that is re-transmitted from the user terminal 100 indicates vibration that is equal to or less than a specified threshold value, the system-control unit 215 may re-transmit the re-registered printing job to the MFP 300. Here, when the vibration-detection information that is re-transmitted from the user terminal 100 indicates vibration that is greater than a specified threshold value, the system-control unit 215 may request the user terminal 100 to re-transmit the printing job (the request in this case may be limited to a specified number of times (for example, three times)), and then move processing to step S114 and determine "NO" without performing the determination of whether or not there is difference in the data amount. When the number of times for requesting the user terminal 100 to re-transmit the printing job is limited to a specified number (for example, three times), after that the system-control unit 215 may again move processing to step S114 and determine "NO" without performing determination of whether or not there is difference in the data amount.

Moreover, when the vibration-detection information that is transmitted together with the printing job from the user terminal 100 indicates vibration that exceeds a specified threshold value, the system-control unit 215 may request the user terminal 100 to re-transmit the printing job, and after the end of step S101 or after the end of step S103, may move processing to step S101. When the number of times for requesting the user terminal 100 to re-transmit the printing job is limited to a specified number (for example, three times), after that the system-control unit 215 may move processing to step S107 and determine "NO" without performing determination of whether or not there is difference in the data amount. When re-transmission of the printing job is requested from the gateway 200, the system-control unit 117 of the user terminal 100 transmits the printing job and the vibration-detection information of the vibration-detection sensor 102 to the gateway 200.

Moreover, when the determination in step S114 is "NO", the system-control unit 215 may move processing to step S111, and after repeating the processing of step S114 a specified number of times (for example, three times), may then execute the processing after step S114.

What is claimed is:

1. A data transmission system, comprising:
    a user terminal having a first vibration-detection sensor and first storage device;
    an image-forming apparatus having a second vibration-detection sensor and second storage device; and
    a relay device having a third storage device, and that after job data that is stored in the first storage device and vibration-detection information of the first vibration-detection sensor that are received from the user terminal are registered in the third storage device, transmits the job data to the image-forming apparatus; wherein
    the image-forming apparatus
    registers the job data in the second storage device, and according to a request from the relay device, transmits the job data that is registered in the second storage device and vibration-detection information of the second vibration-detection sensor to the relay device; and
    the relay device
    compares the amount of data when the job data is registered in the third storage device and the amount of data of the job data from the image-forming apparatus, and when there is difference in the data amount,
    registers trouble information related to the second storage device in the third storage device.

2. The data transmission system according to claim 1, wherein
    the relay device
    compares the amount of data when the job data is registered in the third storage device and the amount of data of the job data from the user terminal, and when there is difference in the data amount,
    registers trouble information related to the first storage device in the third storage device.

3. The data transmission system according to claim 2, wherein
    the third storage device has
    a job database for registering the job data;
    a vibration-detection-information database for registering vibration-detection information of the first vibration-detection sensor and the second vibration-detection sensor; and
    a trouble-information database for registering the trouble information.

4. The data transmission system according to claim 2, wherein
    the trouble information related to the first storage device includes the registration date of the job data, and information that indicates the difference in the amount of data that is associated with the unique terminal information of the user terminal.

5. The data transmission system according to claim 1, wherein
    the trouble information related to the second storage device includes the registration date of the job data, and information that indicates the difference in the amount of data that is associated with the unique apparatus information of the image-forming apparatus.

6. A data transmission method includes:
    a step whereby a relay device registers job data that is registered in a first storage device and vibration-detection information of a first vibration-detection sensor that are received from a user terminal in a third storage device, and then transmits the job data to an image-forming apparatus that has a second vibration-detection sensor and second storage device; and
    a step whereby the image-forming apparatus registers the job data in the second storage device, and according to a request from the relay device, transmits the job data that is registered in the second storage device and vibration-detection information of the second vibration-detection sensor to the relay device; and
    the relay device
    compares the amount of data when the job data is registered in the third storage device and the amount of data of the job data from the image-forming apparatus, and when there is difference in the data amount,
    registers trouble information related to the second storage device in the third storage device.

7. The data transmission method according to claim 6, wherein
    the relay device
    compares the amount of data when the job data is registered in the third storage device and the amount of data of the job data from the user terminal, and when there is difference in the data amount,
    registers trouble information related to the first storage device in the third storage device.

* * * * *